United States Patent
Grisamore et al.

(10) Patent No.: US 12,341,692 B2
(45) Date of Patent: Jun. 24, 2025

(54) DIGITAL COMMUNICATIONS BUS FOR VOLTAGE REGULATOR CONTROL AND STATUS READ OF MULTIPLE POWER STAGES

(71) Applicant: Renesas Electronics America Inc., Milpitas, CA (US)

(72) Inventors: Robert Thomas Grisamore, Austin, TX (US); Kiran Gonsalves, Austin, TX (US); James Robert Toker, Austin, TX (US)

(73) Assignee: Renesas Electronics America Inc., Milpitas, CA (US)

( * ) Notice: Subject to any disclaimer, the term of this patent is extended or adjusted under 35 U.S.C. 154(b) by 670 days.

(21) Appl. No.: 17/567,085

(22) Filed: Dec. 31, 2021

(65) Prior Publication Data

US 2023/0216791 A1 Jul. 6, 2023

(51) Int. Cl.
  *H04L 45/74* (2022.01)
  *G06F 9/22* (2006.01)
  *G06F 13/42* (2006.01)
  *H02M 3/155* (2006.01)
  *H04L 12/40* (2006.01)

(52) U.S. Cl.
  CPC .............. *H04L 45/74* (2013.01); *G06F 9/223* (2013.01); *G06F 13/4282* (2013.01); *H02M 3/155* (2013.01); *H04L 2012/40215* (2013.01)

(58) Field of Classification Search
  CPC .......... H04L 45/74; H04L 2012/40215; H02M 3/155; G06F 13/4282; G06F 9/223
  See application file for complete search history.

(56) References Cited

U.S. PATENT DOCUMENTS

| | | | | |
|---|---|---|---|---|
| 2012/0083902 A1* | 4/2012 | Daum | ................. | H04B 3/548 700/3 |
| 2016/0070335 A1* | 3/2016 | Mitrea | ................. | G06F 1/3243 713/323 |
| 2016/0170930 A1* | 6/2016 | Weng | ................. | G06F 1/26 710/110 |

(Continued)

FOREIGN PATENT DOCUMENTS

| | | | | |
|---|---|---|---|---|
| CN | 107219472 A | * | 9/2017 | ............. G01R 31/40 |
| CN | 110060653 A | * | 7/2019 | ......... G06F 13/4018 |
| CN | 111367395 A | * | 7/2020 | |

*Primary Examiner* — Saad A. Waqas
(74) *Attorney, Agent, or Firm* — SCULLY, SCOTT, MURPHY & PRESSER, P.C.

(57) ABSTRACT

A system including a controller and a plurality of power stages is described. The system can include a communication interface, the plurality of power stages, and a controller connected to the plurality of power stages through the communication interface. The controller can generate a data packet including a command encoding a task and an address identifying at least one power stage among the plurality of power stages. The controller can send the data packet to the plurality of power stages through the communication interface. Each power stage among the plurality of power stages can receive the data packet through the communication interface, compare the address in the data packet with an address assigned to the power stage, determine whether to perform the task based on a result of the comparison between the address in the data packet with an address assigned to the power stage.

20 Claims, 6 Drawing Sheets

(56) References Cited

U.S. PATENT DOCUMENTS

| | | | | |
|---|---|---|---|---|
| 2018/0173262 A1* | 6/2018 | Yang | ........................ | G05F 1/563 |
| 2021/0004072 A1* | 1/2021 | Wadeyar | .................... | G06F 1/28 |
| 2021/0336528 A1* | 10/2021 | Zafarana | ............. | H02M 3/1584 |
| 2022/0103064 A1* | 3/2022 | Sun | ........................ | G01K 1/026 |

* cited by examiner

Fig. 6

DIGITAL COMMUNICATIONS BUS FOR VOLTAGE REGULATOR CONTROL AND STATUS READ OF MULTIPLE POWER STAGES

BACKGROUND OF THE SPECIFICATION

The present disclosure relates in general to operations of power converters. More specifically, the present disclosure relates to a digital communication bus in a multiphase voltage regulator that can control individual power stage and perform state read of individual power stages.

DC-to-DC voltage conversion may be performed by switching voltage regulators or power converters to convert a voltage from a higher level to a lower level that may be required by a load. An example architecture may distribute the higher voltage to multiple voltage regulators or power stages, and each voltage regulator may produce a same or different voltages for one or more loads. A switching voltage regulator may use two or more power transistors to convert energy from one voltage to another voltage. One example of such a switching voltage regulator may be the Buck Regulator, which typically switches a pair of power transistors to produce a square-wave at a common node between the pair of power transistors. The produced square-wave may be smoothed out using an resonant circuit (e.g., an inductor-capacitor (LC) circuit) to produce a desired voltage for a load. A feedback control loop may be configured to control a duty-cycle of the produced square-wave and a resulting value of an output voltage of the voltage converter.

An example voltage regulator architecture may be a multiphase voltage regulator including multiple power stages, and the power stages can be referred to as phases. Each power stage includes its own pair of power transistors (e.g., field-effect transistors (FET)), an inductor and a output capacitor connected to its output, and a controller. The voltage output from each activated power stage can be interleaved at an output node to produce an overall output voltage. The phases are connected in parallel, and different number of power stages can be activated to output different overall output voltages, thus providing different power levels to a load. Further, each power stage can measure parameters (e.g., inductor current and temperature) between the output node and the power stage's output. The measured parameters can be fed back to a master controller connected to the multiple power stages, and can be used by the master controller to maintain satisfying performance level of the overall system and to determine optimal number of power stages to be activated

SUMMARY OF THE INVENTION

In an embodiment, an apparatus for controlling a voltage regulator is generally described. The apparatus can include a controller that includes a communication interface connected to a plurality of power stages in a multiphase voltage regulator. The controller can be configured to generate a data packet. The data packet can include a command encoding a task to be performed by at least one power stage among the plurality of power stages, and an address that identifies the at least one power stage. The controller can be configured to send the data packet to the plurality of power stages using the communication interface.

In another embodiment, an apparatus for regulating voltage is generally described. The apparatus can include a power stage connected to a controller through a communication interface. The power stage can be configured to receive a data packet from the controller through the communication interface. The data packet can include a command encoding a task and an address that identifies at least one power stage among a plurality of power stages. The power stage can be configured to compare the address in the data packet with an address assigned to the power stage. In response to the address in the data packet being the address assigned to the power stage, the power stage can send an acknowledgement signal to the controller through a communication interface to confirm the power stage can perform the task. In response to the address in the data packet being different from the address assigned to the power stage, the power stage can continue to operate without performing the task.

In another embodiment, a system for regulating voltage is generally described. The system can include a communication interface, a plurality of power stages, and a controller connected to the plurality of power stages through the communication interface. The controller can be configured to generate a data packet. The data packet can include a command encoding a task to be performed by at least one power stage among the plurality of power stages and an address that identifies the at least one power stage. The controller can be configured to send the data packet to the plurality of power stages through the communication interface. Each power stage among the plurality of power stages can be configured to receive the data packet through the communication interface. Each power stage among the plurality of power stages can be configured to compare the address in the data packet with an address assigned to the power stage. Each power stage among the plurality of power stages can be configured to determine whether to perform the task based on a result of the comparison between the address in the data packet with an address assigned to the power stage.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

The increasing complexity of information exchange between a master controller and multiple power stages in a voltage regulator requires a more efficient technology to communicate this information. The master controller can generate and provide different pulse width modulation (PWM) signals to different power stages to manage the power stages. Voltage regulators can include discrete pins connecting each power stage to the master controller to pass power state control information, such as enable or disable control signals for activating or deactivating power stages. In an aspect, these power state control information can be handled by special PWM input signal signatures or power stage internal timeout mechanisms. However, these control signals typically do not provide individual power stage control. For example, control commands can be issued by the master controller to all power stages in parallel. Also, multifunction pins on the master controller and the power stages can be used for communicating information, such as fault signals, from the power stages to the master controller. However, these multifunctional pins tend to require complicated drive levels and input thresholds.

Figure 1:
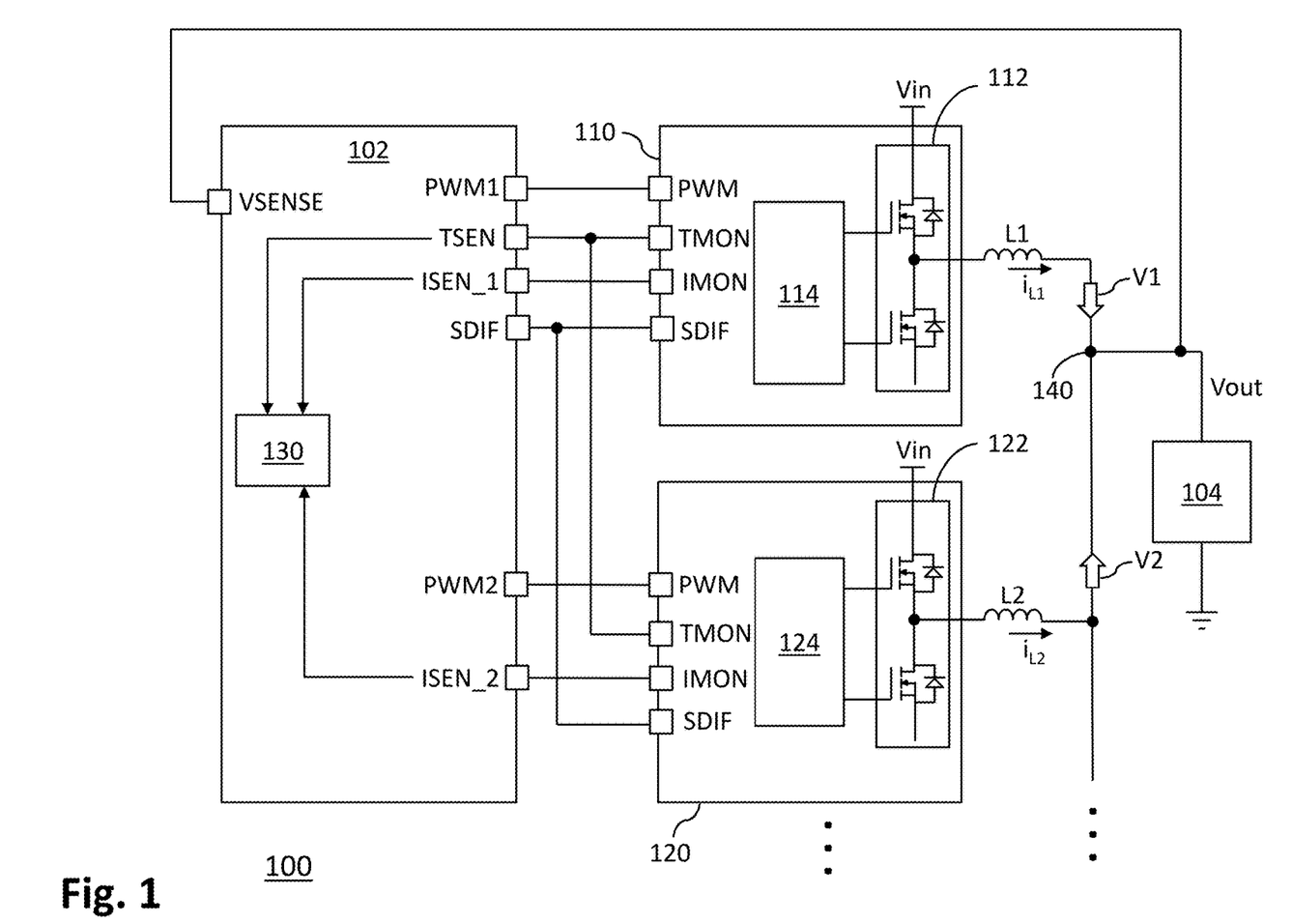
FIG. 1 is a diagram showing an example system that can implement a digital communications bus for voltage regulator control and status read of multiple power stages in one embodiment.

FIG. 1 is a diagram showing an example system 100 that can implement digital communications bus for voltage regulator control and status read of multiple power stages in one embodiment. The system 100 may be an apparatus implementing a multiphase voltage regulator including a controller 102 and at least one voltage regulators or power stages, such as a power stage 110 and a power stage 120. In an example, the controller 102 may be a master controller, or a multiphase controller, and the power stages 110, 120 may include DC-DC converters. The controller 102 may be configured to control the power stage 110 using a pulse width modulation (PWM) signal PWM1 being sent from the controller 102 to the PWM pin of the power stage 110. The power stage 110 may include a power transistor pair 112 and a power stage controller 114. The power transistor pair 112 may include a high side field-effect transistor (FET) and a low side FET. The PWM1 signal can be a control signal that switches the power transistor pairs 112 to convert an input voltage Vin into an output voltage V1.

The controller 102 may be configured to control the power stage 120 using another PWM signal PWM2 being sent from the controller 102 to the PWM pin of the power stage 120. The power stage 120 may include a power transistor pair 122 and a power stage controller 124. The power transistor pair 122 may include a high side FET and a low side FET. The PWM2 signal can be a control signal that switches the power transistor pairs 122 to convert an input voltage Vin into an output voltage V2. The output voltages V1 and V2 can be combined or interleaved at a node 140 to produce an overall output voltage Vout to a load 104. In an example, the waveforms representing PWM1 and PWM2 can be staggered, or out of phase from one another.

In one or more examples, the power stages 110, 120 may be current-sourced devices, voltage-sourced devices, or a device implementing both current and voltage-sourced control. In an example, the power stages 110, 120 may be smart power stage (SPS) devices configured to perform voltage regulation with additional features such as feedback control based on feedback voltage and/or feedback current, or other parameters such as temperature, measured at the outputs of each power stage in the system 100. For example, the power stages 110, 120 can provide information relating to current measured at their corresponding output inductors L1, L2, from the IMON pin of the power stages 110, 120 to the ISEN_1 and ISEN_2 pins of the controller 102, respectively. In another example, the power stages 110, 120 can provide information relating to temperature of the power stages 110, 120 from the TMON pin of the power stages 110, 120 to a TSEN pin of the controller 102.

The power stage controllers 114, 124, can be configured to process the measured parameters of the power stages 110, 120, respectively, before providing the measured parameters to the controller 102. For example, the power stage controllers 114, 124 can amplify and calibrate the measured parameters prior to providing them to the controller 102. Further, a measurement of the output voltage Vout can be fed back to the controller 102 (e.g., received at a VSENSE pin of the controller 102) for various control applications. The power stage controllers 114, 124 can also include drivers configured to drive the power transistor pairs 112, 122 of the power stages 110, 120, respectively.

In an aspect, the controller 102 can be a microcontroller including hardware component such as integrated circuits (IC), memory devices, and other hardware and circuit components. The controller 102 can receive current and/or temperature information from the power stages 110, 120. The controller 102 can be configured to use the received current and/or temperature information to control and maintain the performance of the system 100 at a satisfying level (e.g., within specifications). For example, if the current information returned from the power stages 110, 120 indicates the load 104 is not drawing as much current as expected, the controller 102 can deactivate one or more power stages in the system 100 to reduce an overall power consumption of the system 100.

In an aspect, the controller 102 can enable the power stages in the system 100 individually based on the PWM signals such as PWM1 and PWM2. For example, if the power stage controller 114 detects activity on the PWM pin of the power stage 110, then the power stage 110 is enabled. If the power stage controller 124 detects no activity on the PWM pin of the power stage 112, then the power stage 112 is disabled. A bus or trace communicating the PWM signals from the controller 102 to the power stages 110, 120 may be reserved for providing PWM signals to enable or disable (activate or deactivate) power stages, and not configured for communicating other types of commands or information. For example, the controller 102 cannot use the bus reserved for the PWM signals to send requests or to provide control signals and commands to individual power stages.

In order for the controller 102 to be able to send request, and provide commands, to individual power stages, a digital communication bus labeled as SDIF in FIG. 1 can be integrated in the controller 102 and each power stage in the system 100. In one embodiment, the integrated SDIF pins may replace existing binary pins (e.g., enable pins) on controller 102 and power stages 110, 120. The SDIF bus can be a two-wire serial communication bus configured for communication digital signals (e.g., bit stream having a sequence of bits). The controller 102, and the power stage controllers 114, 124, can include logic circuits configured to interpret signals carried by the SDIF bus. By utilizing the SDIF bus to communicate commands and requests, the controller 102 can individually control the power stages and request information from individual power stages. For example, the controller 102 can send commands using the SDIF to command the power stage 110 to perform a specific calibration, while the power stage 120 does not receive the command to perform the specific calibration. The utilization of the SDIF bus can allow the controller 102 to implement various regulation technologies that optimize the capabilities of both the master controller and power stages using information provided by individual power stages.

Figure 2:
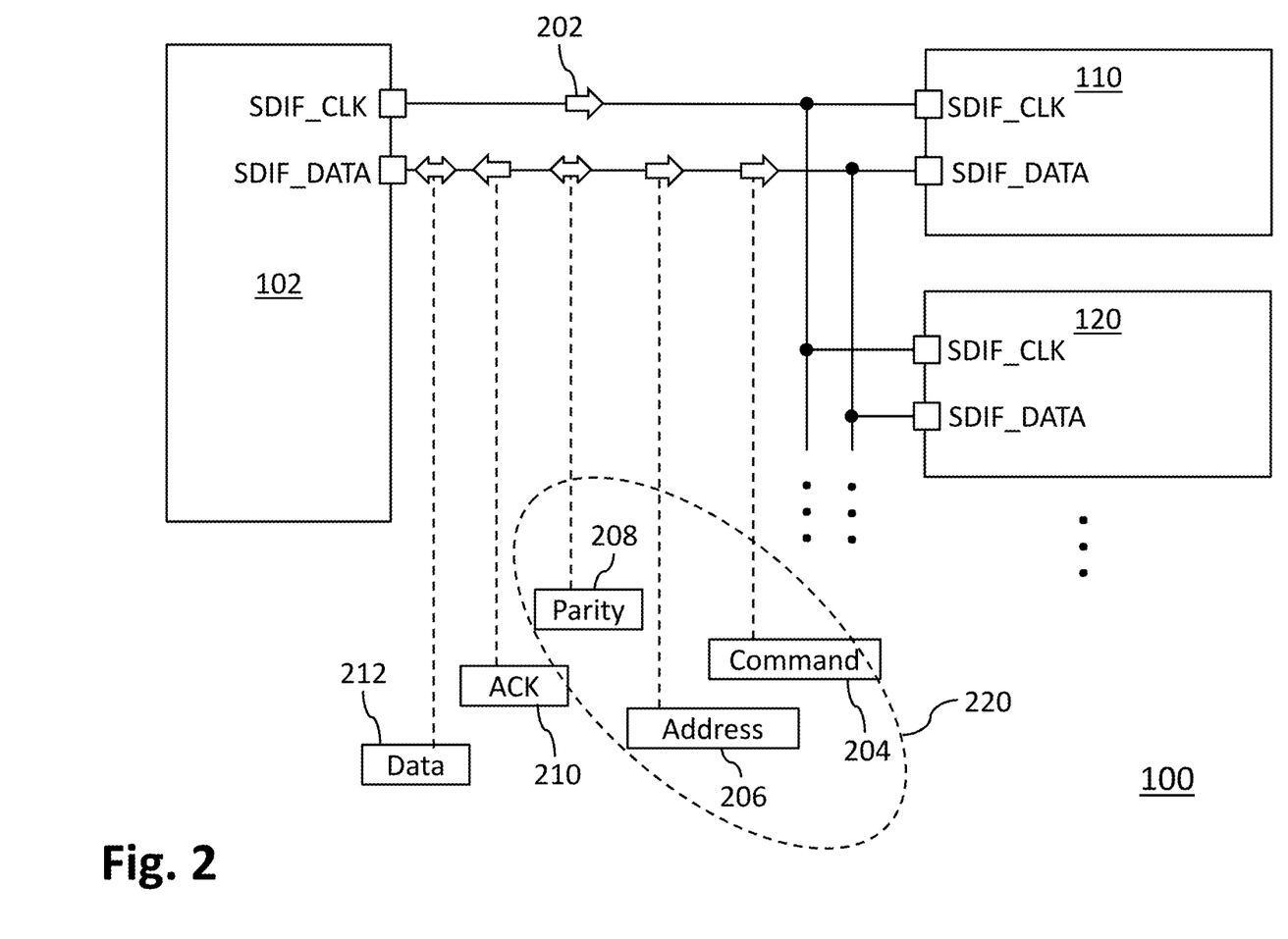
FIG. 2 is a diagram showing details of a digital communications bus for voltage regulator control and status read of multiple power stages in one embodiment.

FIG. 2 is a diagram showing details of a digital communications bus for voltage regulator control and status read of multiple power stages in one embodiment. In the example shown in FIG. 2, the SDIF bus has a two-wire interface including a clock line labeled as SDIF_CLK and a data line labeled as SDIF_DATA. The SDIF_CLK line can be a bus or trace carrying a clock signal 202 from the controller 102 to the power stages in the system 100. The clock signal 202 can be a clock signal that coordinates operations of the controller 102 and the power stages in the system 100 with signals being carried by the SDIF_DATA line. The SDIF_DATA bus or line can be a bidirectional data line (e.g., open-drain) that allows the controller 102 and the power stages of the system 100 to exchange various data and information. In one embodiment, the SDIF_DATA line can be driven on a rising edge of the clock signal 202 on the SDIF_CLK line, and can be sampled on a falling edge of the clock signal 202 on the SDIF_CLK line.

In an embodiment, the controller 102 can generate a command data packet 220 and send the command data packet 220 to all power stages of the system 100 using the SDIF bus. The command data packet 220 can include a command 204, an address 206, a parity bit 208. In one embodiment, the command 204 can be encoded in a multibit sequence. The command 204 can be a command to instruct one or more power stages in the system 100 to perform a specific task. The address 206 in the command data packet 220 can be an address identifying one power stage, or an address identifying a group of power stages, or can be an address identifying all power stages, in the system 100. The parity bit 208 can be added to the command data packet 220 for verification purposes. In one or more embodiments, the command 204 can be an initialization command, a read operation, a write operation, a request for temperature information, a request for inductor current information, a command to perform auto-zero calibration or auto-gain calibration, etc. The following table (Table 1) shows an example list of 4-bit sequence that can be used for encoding the command 204:

TABLE 1

| Command | 4-bit sequence | | | |
|---|---|---|---|---|
| Initialization | 0 | 0 | 0 | 0 |
| Register Read | 0 | 0 | 0 | 1 |
| Register Write | 0 | 0 | 1 | 0 |
| Set SPS Mode 0 | 0 | 0 | 1 | 1 |
| Set SPS Mode 1 | 0 | 1 | 0 | 0 |
| Set SPS Mode 2 | 0 | 1 | 0 | 1 |
| Set SPS Mode 3 | 0 | 1 | 1 | 0 |
| Set SPS Mode 4 | 0 | 1 | 1 | 1 |
| Set SPS Mode 5 | 1 | 0 | 0 | 0 |
| Get Temperature | 1 | 0 | 0 | 1 |
| Get Voltage/Current | 1 | 0 | 1 | 0 |
| Start AZ | 1 | 0 | 1 | 1 |
| End AZ | 1 | 1 | 0 | 0 |
| Read Cal. Data | 1 | 1 | 0 | 1 |
| Write Cal. Data | 1 | 1 | 1 | 0 |
| ZAP | 1 | 1 | 1 | 1 |

The list of commands in Table 1 can be an example list of commands, and the system 100 can be configured to use other commands not shown in Table 1, and multibit sequences other than 4-bit sequence can also be used for encoding commands. For example, in one embodiment, the system 100 may assign "1100" to another command instead of End AZ, and the system 100 can be configured to terminate an auto-zero process under the command "1011", assigned to Start AZ, in response to a presence of any new command on the SDIF bus.

The power stages of the system 100 can receive the same command data packet 220, but may or may not perform the task indicated by the command 204 based on the address 206. The power stage controllers in each power stage (e.g., power stage controllers 114, 124 in FIG. 1) of the system 100 can be configured to decode the command data packet 220. The power stage controllers can decode the command 204 and the address 206 in order to determine whether to perform a task indicated by the command 204 in response to receiving the command data packet 220. For example, if the address 206 identifies the power stage 110, then power stage 110 can perform the task encoded in the command 204 but the power stage 120 may not perform the task encoded in the command 204 even if it received the same command data packet 220. If the address 206 identifies a group of power stages including both power stages 110, 120, then both power stages 110, 120 can perform the task encoded in the command 204. If the address 206 identifies all power stages of the system 100, then all power stages of the system 100 can perform the task encoded in the command 204.

Further, each power stage controllers can be configured to send an acknowledgement signal ("ACK") 210 to the controller 102, via the SDIF_DATA line, in response to the address 206 identifying its own address, or identifying a group of power stages it belongs to, or identifying all power stages of the system 100. For example, if the address 206 identifies the power stage 110, then the power stage 110 can send the ACK 210 to the controller 102 via the SDIF_DATA line in response to receiving the command data packet 220, but the power stage 120 may not send the ACK 210. If the address 206 identifies a group of power stages including both power stages 110, 120, then both power stages 110, 120 can send the ACK 210 to the controller 102 via the SDIF_DATA line in response to receiving the command data packet 220. If the address 206 identifies all power stages of the system 100, then all power stages of the system 100 can send the ACK 210 to the controller 102 via the SDIF_DATA line in response to receiving the command data packet 202.

Figure 3:
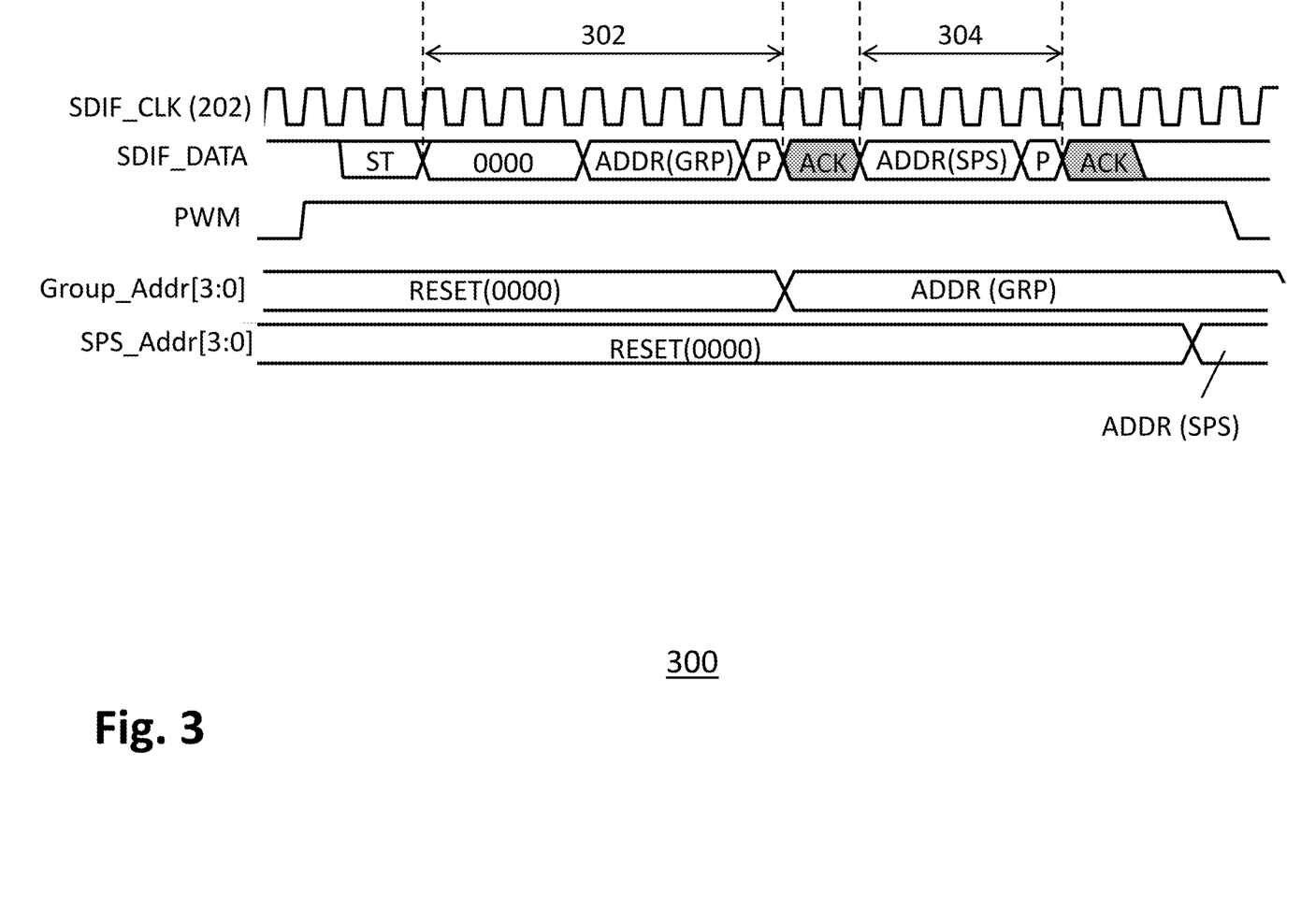
FIG. 3 is a diagram showing a timing diagram of an initialization of a system implementing a digital communications bus for voltage regulator control and status read of multiple power stages in one embodiment.

Referring to Table 1, the "Initialization" command encoded by the 4-bit sequence "0000" can be used by the controller 102 to assign addresses to the power stages (see FIG. 3). The "Set SPS Mode" commands encoded by the 4-bit sequences "0011" to "1000" can be used by the controller 102 to set the power stages of the system 100 to various modes, such as high power mode, low power mode, etc. The commands "Get Temperature" and "Get Voltage" can be commands to request one or more power stages to provide temperature and/or voltage or current information. The "Start AZ" command can be a command to request one or more power stages to perform auto-zero calibration, and the "End AZ" command can be a command to stop the auto-zero calibration being performed by the one or more power stages. The "Write Cal. Data" and "Read Cal. Data" tasks shown in Table 1 can allow the controller 102 to write or store calibration information (e.g., that may include vendor product information) to each power stage and to read the stored calibration information, respectively. The controller 102 can use the stored calibration information for a production auto test program that tunes the power stages by programming fuses of the power stages individually. Note that other tasks and/or calibrations, such as auto-gain calibration, can be encoded in the command 204 as well. The number of bits in the multibit sequence encoding the command 204, the address 206, and the data 212, can be arbitrary and may not be fixed, thus providing a flexibility to develop additional tasks that can be encoded in the command 204 and assigned to be performed by individual power stages.

FIG. 3 is a diagram showing a timing diagram of an initialization of a system implementing a digital communications bus for voltage regulator control and status read of multiple power stages in one embodiment. A timing diagram in FIG. 3 shows an initialization 300 of the system 100 (see FIG. 1) in order for controller 102 to individually control and command the power stages in the system 100. In the timing diagram shown in FIG. 3, the clock signal 202 is being carried by the SDIF_CLK bus or line. The SDIF_DATA bus or line can carry other signals or data from the controller 102 to the power stages, such as the command 204, the address 206, the parity bit 208, the ACK 210, the data 212, etc. (see FIG. 2). The controller 102 can send a PWM signal on a PWM line that can be different from the SDIF bus (e.g., PWM1, PWM2 in FIG. 1), to a specific power stage to enable the specific power stage. The specific power stage can be one of the power stages 110, 120, or any power stage in the system 100 shown in FIG. 1.

In one embodiment, the specific power stage can be the power stage 110. The initialization 300 can begin with the controller 102 sending a PWM signal on the PWM line to the power stage 110. Then, the controller 102 can send a start signal, labeled as ST, to all power stages in the system 100 on the SDIF_DATA line, where the start signal ST can be a 2-bit sequence. Note that since only the power stage 110 may react to the start signal ST even though the start signal ST is on the SDIF_DATA line, and the disabled power stages will not react to the start signal ST. The controller 102 can generate an initialization data packet 302 that includes an initialization command encoded in the command 204 (e.g., "0000" in Table 1) and a group address ADDR(GRP) encoded in the address 206. The group address ADDR(GRP) can identify a group of power stages that include the power stage 110. In another embodiment, the address ADDR(GRP) can identify all power stages in the system 100. The initialization data packet 302 can also include the parity bit 208 (labeled as P in FIG. 3). The controller 102 can send the initialization data packet 302 to all power stages using the SDIF_DATA line. Note that since only the PWM line connected to power stage 110 has activity (e.g., a PWM signal), the power stages other than the power stage 110 may not be listening to the SDIF_DATA bus and therefore may not receive the initialization data packet 302.

The power stage 110 can receive the start signal ST and the initialization data packet 302 that includes the command 204 encoding the initialization command, the group address ADDR(GRP), and the parity bit 208. The power stage controller 114 of the power stage 110 can decode the command 204 to determine that the initialization 300 is being performed. In one embodiment, in response to decoding the command 204 as an initialization command, the power stage controller 114 can reset a register labeled as Group_Addr that is reserved for storing a group address, and another register labeled as SPS_Addr that is reserved for storing a power stage address. In the example shown in FIG. 3, the Group_Addr and SPS_Addr registers have no previously stored addresses and the power stage controller 114 may not need to reset the Group_Addr and SPS_Addr registers in response to decoding the initialization command.

The power stage 110 can decode the address 206 that follows the command 204. In the example, shown in FIG. 3, the power stage 110 can receive the group address ADDR (GRP) following the command 204 ("0000"), and can write ADDR(GRP) in the group address register Group_Addr. In one embodiment, each power stage in the system 100 can include memory devices configured to store instructions, lookup tables, state machines, etc., that indicate an initialization command is followed by a group address, then a parity bit. The stored state machines can allow the power stages to be aware of expected sequences of data on the SDIF_DATA bus for different types of commands. Based on the stored state machines, the power stage controller 114 can determine that the address ADDR(GRP) following the command "0000" is an address identifying a group of power stages including one or more power stages, or all power stages, that includes the power stage 110. In response to writing ADDR(GRP) in the group address register Group_Addr, the power stage 114 of the power stage 110 can send the ACK 210 to the controller 102 to confirm receipt of the initialization command and the group address ADDR (GRP). Note that in the timing diagram for SDIF_DATA line, the shaded data (e.g., the two instances of ACK 210) are data being sent from a power stage (e.g., power stage 110) to the controller 102, and the unshaded data (e.g., ST, "0000", ADDR(GRP), P, ADDR(SPS), etc.) are data being sent from the controller 102 to one or more power stages. In one embodiment, the power stages of the system 100 can be configured to reject the command 204 in response to the parity bit 208 being a wrong parity.

The controller 102 can receive the ACK 210 from the power stage 110 and, in response, can proceed to generate another data packet 304 including a power stage address ADDR(SPS) encoded in a multibit sequence and a corresponding parity bit. The power stage address ADDR(SPS) can identify the specific power stage that is active (e.g., having a PWM line with activity), such as the power stage 110. The controller 102 can send the data packet 304 to the power stage 110 using the SDIF_DATA bus. The power stage 110 can decode the data packet 304 encoding ADDR (SPS), and can write ADDR(SPS) in the power stage address register SPS_Addr. In one embodiment, based on state machines stored in the power stage 110, the power stage controller 114 can determine that the address ADDR(SPS) following the initialization data packet 302 is an address identifying one power stage (e.g., power stage 110). In response to writing ADDR(SPS) in the power stage address register SPS_Addr, the power stage 114 of the power stage 110 can send another ACK 210 to the controller 102 to confirm receipt of the power stage address ADDR(SPS).

The controller 102 can receive the ACK 210 confirming receipt of the power stage address ADDR(SPS) and, in response, can disable the power stage 110 by pulling the PWM signal on the PWM line low. The controller can repeat the initialization 300 for another power stage, such as the power stage 120, to assign group address and power stage address to the power stage 120. The controller 102 can repeat the initialization 300 for all power stages, sequentially and individually, of the system 100. In response to performing initialization 300 for all power stages in the system 100, each power stage in the system 100 will be assigned with a group address and a power stage address.

Figure 4A:
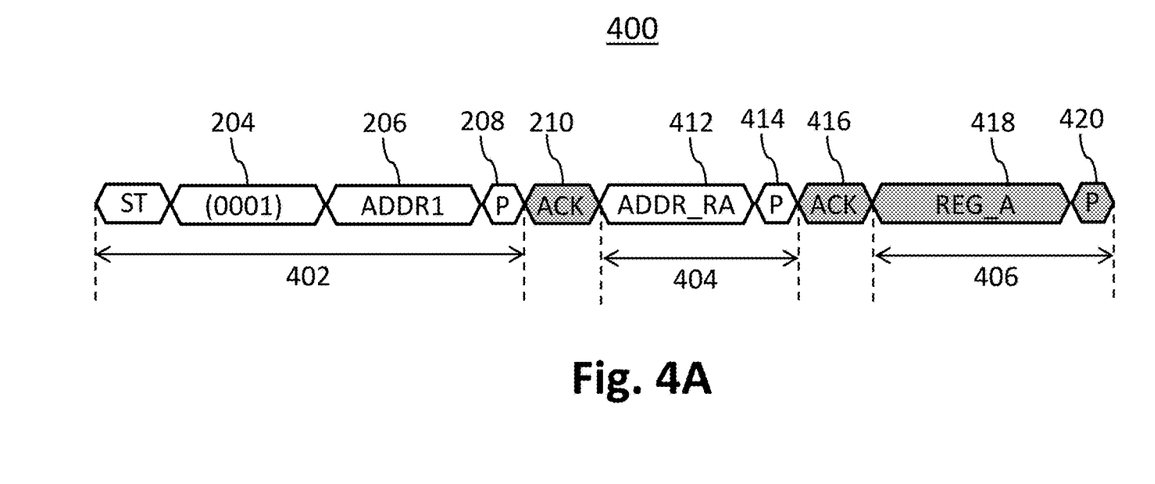
FIG. 4A is a diagram showing a timing diagram of a read operation using a digital communications bus for voltage regulator control and status read of multiple power stages in one embodiment.

FIG. 4A is a diagram showing a timing diagram of a read operation using a digital communications bus for voltage regulator control and status read of multiple power stages in one embodiment. A timing diagram in FIG. 4A shows a read operation 400 being performed by the controller 102 of FIG. 1. The read operation 400 can be performed by the controller 102 subsequent to the initialization 300 shown in FIG. 3. In the timing diagram shown in FIG. 4A, the controller 102 can encode a read command in the command 204 (e.g., "0001" in Table 1) and encode a target address ADDR1 in the address 206. The controller 102 can generate a data packet 402 including at least the read command "0001" and the target address ADDR1. The target address ADDR1 can identify a specific power stage, a group of power stages, or all power stages, in the system 100. The controller 102 can send the data packet 402 to all power stages in the system 100 by using the SDIF_DATA line (see FIG. 2 and FIG. 3).

All power stages in the system 100 can receive the data packet 402 on the SDIF_DATA line, but not all power stages may perform the read operation 400. In an example, the address ADDR1 can identify the power stage 110. The power stage controller 114 of the power stage 110 can receive the data packet 402 and decode the address ADDR1 and compare ADDR1 with the group address and power stage address stored in the Group_Addr and SPS_Addr registers of power stage 110. In response to ADDR1 being identical to at least one of the group address and power stage address stored in the Group_Addr and SPS_Addr registers, the power stage 110 can decode the command 204 ("0001") to determine that the command 204 is a read operation. In response to determining that the command 204 is a read operation, the power stage controller 114 of the power stage 110 can proceed to perform the command indicated in the command 204 (e.g., the read operation).

Since the data packet 402 is on the SDIF_DATA line, all power stages (or all enabled power stages) in the system 100 can receive the data packet 402 as well. For example, the address ADDR1 can identify the power stage 110. The power stage controller 124 of the power stage 120 can receive the data packet 402 and decode the address ADDR1 and compare ADDR1 with the group address and power stage address stored in the Group_Addr and SPS_Addr registers of power stage 120. In response to ADDR1 being different from both the group address and power stage address stored in the Group_Addr and SPS_Addr registers, the power stage 120 can continue to operate without decoding the command 204 and without performing the read operation.

To perform the read operation, the power stage 110 can send the ACK 210 to the controller 102 to confirm that it can perform the read operation. Note that in the timing diagram shown in FIG. 4A, the shaded data (e.g., the ACK 210) are data being sent from a power stage (e.g., power stage 110) to the controller 102, and the unshaded data (e.g., "0001", ADDR1, P, etc.) are data being sent from the controller 102 to one or more power stages on the SDIF_DATA line. The controller 102 can receive the ACK 210 from the power stage 110 and, in response can encode one or more register addresses as a multibit sequence ADDR_RA. The controller 102 can generate another data packet 404 that includes the register addresses ADDR_RA and a parity bit 414, and can send the data packet 404 to all power stages in the system 100 using the SDIF_DATA line.

In an example, based on the determination that the address ADDR1 identifies the power stage 110, the power stage 110 can be anticipating addresses of registers to be read by the controller 102. Therefore, even though all power stages in the system 100 can receive the data packet 404 on the SDIF_DATA line, only the power stages identified by the address 206 in the data packet 402 may anticipate the register addresses. The rest of the power stages not identified by the address 206 may not react to the receipt of the data packet 404. For example, the power stages not identified by the address 206 may not fulfill the read operation 400.

In response to receiving the data packet 404, the power stage controller 114 of the power stage 110 can decode the register address ADDR_RA and send an ACK 416 to the controller 102 to confirm receipt of the data packet 404. The controller 102 can receive the ACK 416 and anticipate data stored in the registers identified by ADDR_RA from the power stages identified by ADDR1 (e.g., power stage 110). The power stage controller 114 of the power stage 110 can generate a data packet 406 that includes register data 418 and a parity bit 420. The register data 418 can be data stored in the registers identified by ADDR_RA. The power stage 114 of the power stage 110 can send the data packet 406 to the controller 102 to fulfill the read operation 400.

Figure 4B:
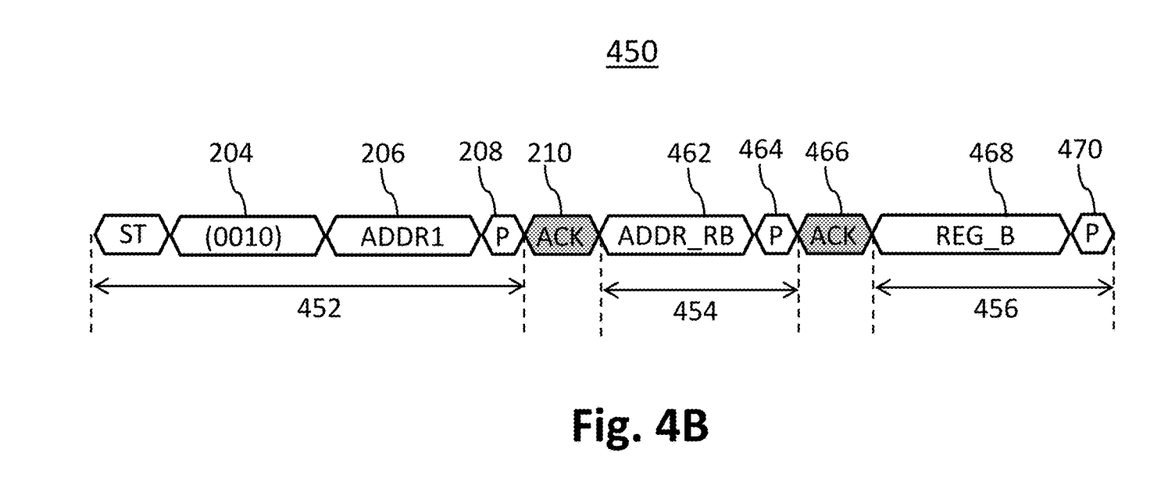
FIG. 4B is a diagram showing a timing diagram of a write operation using a digital communications bus for voltage regulator control and status read of multiple power stages in one embodiment.

FIG. 4B is a diagram showing a timing diagram of a write operation using a digital communications bus for voltage regulator control and status read of multiple power stages in one embodiment. A timing diagram in FIG. 4B shows a write operation 450 being performed by the controller 102 of FIG. 1. The write operation 450 can be performed by the controller 102 subsequent to the initialization 300 shown in FIG. 3. In the timing diagram shown in FIG. 4B, the controller 102 can encode a write command in the command 204 (e.g., "0010" in Table 1) and encode the target address ADDR1 in the address 206. The controller 102 can generate a data packet 452 including at least the write command "0010" and the target address ADDR1. The target address ADDR1 can identify a specific power stage, a group of power stages, or all power stages, in the system 100. The controller 102 can send the data packet 452 to all power stages in the system 100 by using the SDIF_DATA line (see FIG. 2 and FIG. 3).

All power stages in the system 100 can receive the data packet 452 on the SDIF_DATA line, but not all power stages may perform the write operation 450. In an example, the address ADDR1 can identify the power stage 110. The power stage controller 114 of the power stage 110 can receive the data packet 452 and decode the address ADDR1 and compare ADDR1 with the group address and power stage address stored in the Group_Addr and SPS_Addr registers of power stage 110. In response to ADDR1 being identical to at least one of the group address and power stage address stored in the Group_Addr and SPS_Addr registers, the power stage 110 can decode the command 204 ("0010") to determine that the command 204 is a write operation. In response to determining that the command 204 is a write operation, the power stage controller 114 of the power stage 110 can proceed to perform the command indicated in the command 204 (e.g., the write operation).

Since the data packet 452 is on the SDIF_DATA line, all power stages (or all enabled power stages) in the system 100 can receive the data packet 452 as well. For example, the address ADDR1 can identify the power stage 110. The power stage controller 124 of the power stage 120 can receive the data packet 452 and decode the address ADDR1 and compare ADDR1 with the group address and power stage address stored in the Group_Addr and SPS_Addr registers of power stage 120. In response to ADDR1 being different from both the group address and power stage address stored in the Group_Addr and SPS_Addr registers, the power stage 120 can continue to operate without decoding the command 204 and without performing the write operation.

To perform the write operation, the power stage 110 can send the ACK 210 to the controller 102 to confirm that it can perform the write operation. Note that in the timing diagram shown in FIG. 4B, the shaded data (e.g., the ACK 210) are data being sent from a power stage (e.g., power stage 110) to the controller 102, and the unshaded data (e.g., "0010", ADDR1, P, etc.) are data being sent from the controller 102 to one or more power stages on the SDIF_DATA line. The controller 102 can receive the ACK 210 from the power stage 110 and, in response can encode one or more register addresses 462 as a multibit sequence (labeled as ADDR_RB). The controller 102 can generate another data packet 454 that includes the register addresses ADDR_RB and a parity bit 464, and can send the data packet 454 to all power stages in the system 100 using the SDIF_DATA line.

In an example, based on the determination that the address ADDR1 identifies the power stage 110, the power stage 110 can be anticipating addresses of registers to be overwritten by the controller 102. Therefore, even though all power stages in the system 100 can receive the data packet 454 on the SDIF_DATA line, only the power stages identified by the address 206 in the data packet 452 may anticipate the register addresses. The rest of the power stages not identified by the address 206 may not react to the receipt of the data packet 454 and may not be listening to the SDIF_DATA bus for the register addresses.

In response to receiving the data packet 454, the power stage controller 114 of the power stage 110 can decode the register address ADDR_RB and send an ACK 466 to the controller 102 to confirm receipt of the data packet 454. The controller 102 can receive the ACK 466 and generate another data packet 456. The data packet 456 can include data 468, labeled as REG_B, and a parity bit 470. The data 468 can be data to be written to the registers identified by the register addresses 462. The controller 102 can send the data packet 456 to the power stage 110 using the SDIF_DATA bus to fulfill the write operation 450.

By using the SDIF communication interface to send commands, such as read and write requests, the controller 102 can selectively read and write from individual power stages (or individual group of power stages). This individual control can allow the controller 102 to maintain the entire system 100 and other parameters, such as the output voltage, at a more granular manner. The SDIF communication interface can provide multibit communication of control and status information between a master controller (e.g., the controller 102) and multiple power stages. The SDIF communication interface can carry enable or disable control signals, power state control signals, device fault status, power stage specific information the master controller can interpret for optimizing voltage regulation, and other useful control and status information. Further, the SDIF communications interface can allow the controller 102 to provide commands to individual power stages, and also request information from individual power stages. By being able to control the power stages individually, and request information from power stages individually, the controller 102 can implement various regulation technologies that optimize the capabilities of both the master controller and power stages using individual power stages information.

Figure 5:
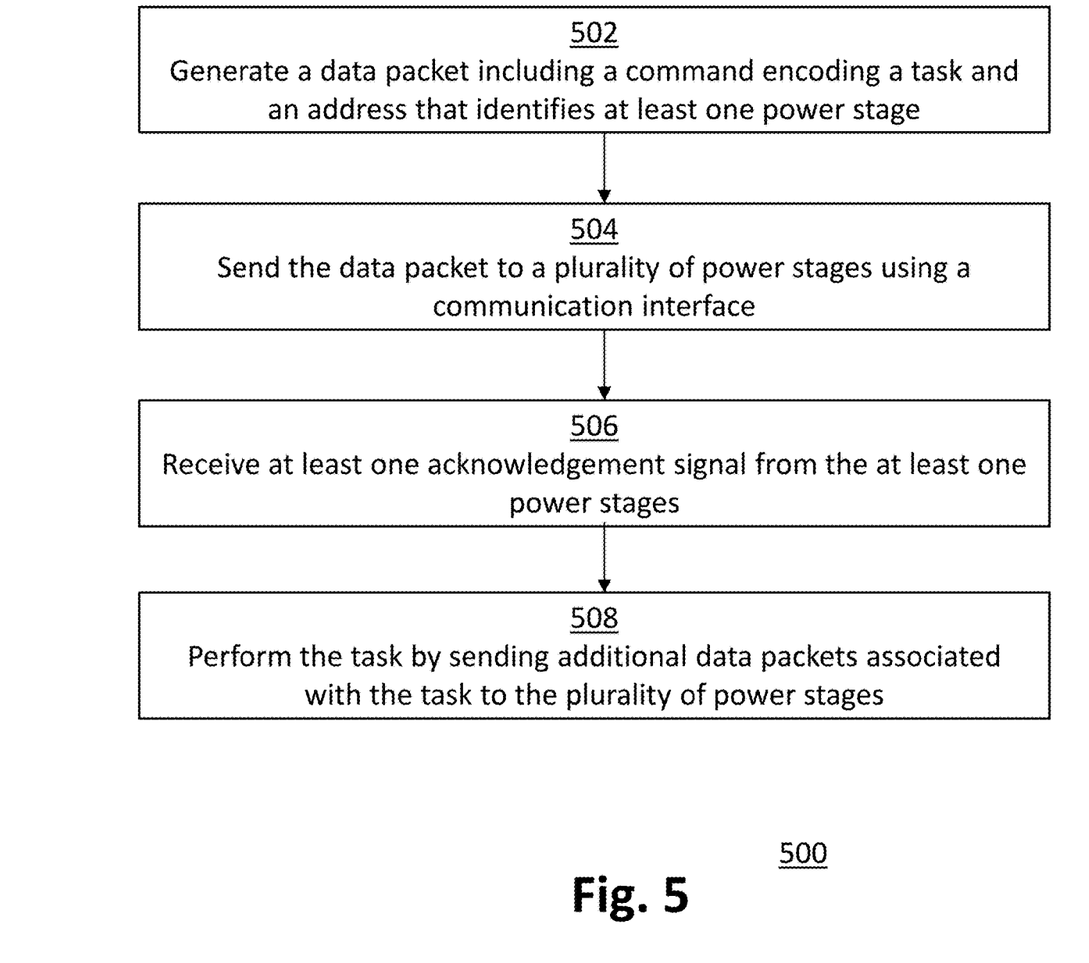
FIG. 5 is a flowchart of an example process that may implement a digital communications bus for voltage regulator control and status read of multiple power stages according to an embodiment of the disclosure.

FIG. 5 is a flowchart of an example process 500 that may implement a digital communications bus for voltage regulator control and status read of multiple power stages according to an embodiment of the disclosure. The process 500 can include one or more operations, actions, or functions as illustrated by one or more of blocks 502, 504, 506, and/or 508. Although illustrated as discrete blocks, various blocks can be divided into additional blocks, combined into fewer blocks, eliminated, performed in different order, or performed in parallel, depending on the desired implementation.

The process 500 can be performed by a master controller of a voltage regulator having multiple power stages. The process 500 can begin at block 502. At block 502, the master controller can generate a data packet including a command encoding a task and an address that identifies at least one power stage. In one embodiment, the communication interface can be a serial and digital communication interface including a clock line and a data line, and the data packet is sent to the plurality of power stages through the data line. In one embodiment, the command can be encoded in a first multibit sequence and the address can be encoded in a second multibit sequence.

The process 500 can proceed from block 502 to block 504. At block 504, the master controller can send the data packet to a plurality of power stages using a communication interface. The process 500 can proceed from block 504 to block 506. At block 506, the master controller can receive at least one acknowledgement signal from the at least one power stages. The process 500 can proceed from block 506 to block 508. At block 508, the master controller can perform the task by sending additional data packets associated with the task to the plurality of power stages.

In one embodiment, prior to the generation of the data packet, the controller can enable the at least one power stage. The controller can generate an initialization data packet including an initialization command and an address to be assigned to the at least one power stage. The controller can send the initialization data packet to the enabled power stages using the communication interface.

Figure 6:
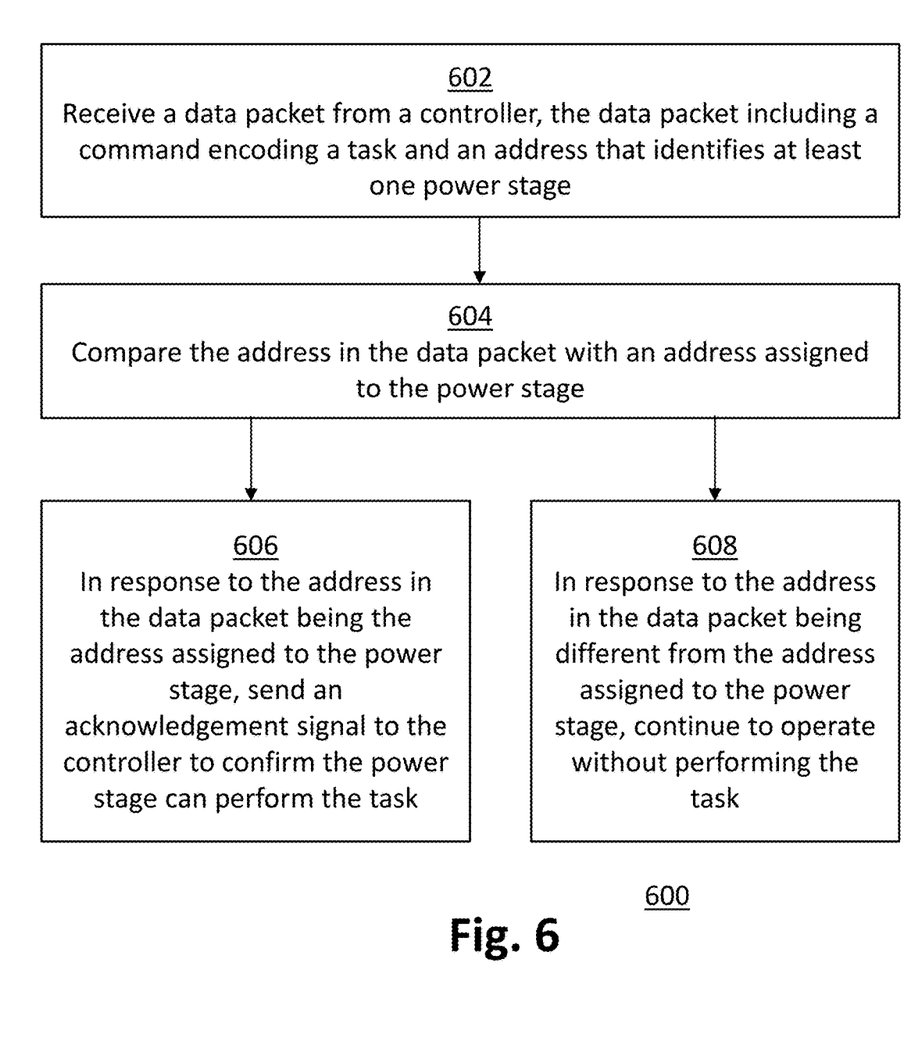
FIG. 6 is a flowchart of another example process that may implement a digital communications bus for voltage regulator control and status read of multiple power stages according to an embodiment of the disclosure.

FIG. 6 is a flowchart of another example process 600 that may implement a digital communications bus for voltage regulator control and status read of multiple power stages according to an embodiment of the disclosure. The process 600 can include one or more operations, actions, or functions as illustrated by one or more of blocks 602, 604, 606, and/or 608. Although illustrated as discrete blocks, various blocks can be divided into additional blocks, combined into fewer blocks, eliminated, performed in different order, or performed in parallel, depending on the desired implementation.

The process 600 can be performed by a power stage among a plurality of power stages in a voltage regulator. The process 600 can begin at block 602. At block 602, the power stage can receive a data packet from a controller. The data packet can include a command encoding a task and an address that identifies at least one power stage. In one embodiment, the communication interface can be a serial and digital communication interface including a clock line and a data line, and the data packet is received through the data line. In one embodiment, the command can be encoded in a first multibit sequence and the address is encoded in a second multibit sequence. In one embodiment, the address assigned to the power stage can identify one of the power stage, a group of power stages including the power stage, and the plurality of power stages.

The process 600 can proceed from block 602 to block 604. At block 604, the power stage can compare the address in the data packet with an address assigned to the power stage. In response to the address in the data packet being the address assigned to the power stage, the process 600 can proceed from block 604 to block 606. At block 606, the power stage can send an acknowledgement signal to the controller to confirm the power stage can perform the task.

In one embodiment, the power stage can be further configured to receive additional data packets associated with the task from the controller.

In response to the address in the data packet being different from the address assigned to the power stage, the process 600 can proceed from block 604 to block 608. At block 608, the power stage can continue to operate without performing the task. In one embodiment, prior to the receipt of the data packet, the power stage can receive an initialization data packet. The initialization data packet can include an initialization command and the address assigned to the power stage. The power stage can store the address assigned to the power stage in a memory device of the power stage.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
   a controller that includes a communication interface connected to a plurality of power stages in a multiphase voltage regulator, wherein the communication interface provides a two- way communication between the controller and the plurality of power stages, the controller being configured to:
      control the plurality of power stages using at least one pulse width modulation (PWM) signal being output from a plurality of PWM output pins that are different from the communication interface;
      send an initialization data packet sequentially, using the communication interface, to the plurality of power stages until every one of the plurality of power stages stores a corresponding power stage address and a corresponding group address assigned by the controller, wherein a power stage address identifies one power stage and a group address identifies two or more power stages;
      generate a data packet including:
         a command encoding a task to be performed by at least one power stage among the plurality of power stages; and
         an address that is one of a power stage address identifying a specific power stage to perform the task and a group address identifying two or more power stages including the specific power stage to perform the task; and
      send the data packet to the plurality of power stages using the communication interface.

2. The apparatus of claim 1, wherein the communication interface is a serial and digital communication interface including a clock line and a data line, and the data packet is sent to the plurality of power stages through the data line.

3. The apparatus of claim 1, wherein the controller is further configured to:
   receive at least one acknowledgement signal from the at least one power stage; and
   in response to the receipt of the at least one acknowledgement signal, perform the task by sending additional data packets associated with the task to the plurality of power stages.

4. The apparatus of claim 1, wherein the command is encoded in a first multibit sequence and the address is encoded in a second multibit sequence.

5. The apparatus of claim 1, wherein the controller is configured to, prior to sending the initialization data packet:
   enable a power stage among the plurality of power stages;
   generate the initialization data packet, wherein the initialization data packet comprises:
      an initialization command; and
      at least one of a power stage address and a group address to be assigned to the enabled power stage.

6. An apparatus comprising:
   a power stage connected to a controller through a communication interface, wherein the power stage is among a plurality of power stages, the communication interface provides a two-way communication between the controller and the plurality of power stages, and the power stage is configured to:
      receive at least one pulse width modulation (PWM) signal being output from a plurality of PWM output pins of the controller, wherein the plurality of PWM output pins are different from the communication interface;
      receive, from the communication interface, a power stage address identifying the power stage and a group address identifying the power stage and at least one other power stage among the plurality of power stages;
      store the power stage address and the group address in a memory device of the power stage;
      receive a data packet from the controller through the communication interface, wherein the data packet includes:
         a command encoding a task; and
         an address that is one of a power stage address identifying a specific power stage to perform the task and a group address identifying two or more power stages including the specific power stage to perform the task;
      compare the address in the data packet with the power stage address and group address stored in the memory device of the power stage;
      in response to the address in the data packet being one of the power stage address and the group address stored in the memory device of the power stage, send an acknowledgement signal to the controller through the communication interface to confirm the power stage can perform the task; and in response to the address in the data packet being different from the power stage address and the group address stored in the memory device of the power stage, continue to operate without performing the task.

7. The apparatus of claim 6, wherein the communication interface is a serial and digital communication interface including a clock line and a data line, and the data packet is received through the data line.

8. The apparatus of claim 6, wherein the power stage is further configured to receive additional data packets associated with the task from the controller.

9. The apparatus of claim 6, wherein the command is encoded in a first multibit sequence and the address is encoded in a second multibit sequence.

10. The apparatus of claim 6, wherein the initialization data packet comprises:
   an initialization command; and
   at least one of a power stage address and a group address to be assigned to the power stage.

11. The apparatus of claim 6, wherein the group address assigned to the power stage identifies one of:
   a subset of the plurality of power stages including the power stage; and
   the plurality of power stages.

12. A system comprising:
   a communication interface;
   a plurality of power stages; and
   a controller connected to the plurality of power stages through the communication interface, wherein the communication interface provides a two-way communication between the controller and the plurality of power stages, the controller being configured to:
      control the plurality of power stages using at least one pulse width modulation (PWM) signal being output from a plurality of PWM output pins that are different from the communication interface;
      send an initialization data packet sequentially, using the communication interface, to the plurality of power stages until every one of the plurality of power stages stores a corresponding power stage address and a corresponding group address assigned by the controller, wherein a power stage address identifies one power stage and a group address identifies two or more power stages;
      generate a data packet including:
         a command encoding a task to be performed by at least one power stage among the plurality of power stages; and
         an address that is one of a power stage address identifying a specific power stage to perform the task and a group address identifying two or more power stages including the specific power stage to perform the task; and
      send the data packet to the plurality of power stages through the communication interface,
   wherein each power stage among the plurality of power stages is configured to:
      receive the at least one PWM signal being output from the plurality of PWM output pins of the controller;
      receive, from the communication interface, an initialization data packet that includes a power stage address identifying the power stage and a group address identifying the power stage and at least one other power stage among the plurality of power stages;
      store the corresponding power stage address and the corresponding group address in a memory device;
      receive the data packet through the communication interface;
      compare the address in the data packet with the power stage address and the group address stored in the memory device; and
      determine whether to perform the task based on a result of the comparison between the address in the data packet with the power stage address and the group address stored in the memory device.

13. The system of claim 12, wherein each power stage is configured to:
   in response to the address in the data packet being one of the power stage address and the group address stored in the memory device, send an acknowledgement signal to the controller to confirm the power stage can perform the task; and
   in response to the address in the data packet being different from the power stage address and the group address stored in the memory device, continue to operate without performing the task.

14. The system of claim 12, wherein the communication interface is a serial and digital communication interface including a clock line and a data line, and the data packet is sent to the plurality of power stages through the data line.

15. The system of claim 12, wherein the controller is further configured to:
   receive at least one acknowledgement signal from the at least one power stages; and
   in response to the receipt of the at least one acknowledgement signal, perform the task by sending additional data packets associated with the task to the plurality of power stages.

16. The system of claim 12, wherein the command is encoded in a first multibit sequence and the address is encoded in a second multibit sequence.

17. The system of claim 12, wherein the controller is configured to, prior to sending the initialization data packet:
   enable a power stage among the plurality of power stages;
   generate the initialization data packet, wherein the initialization data packet comprises:
      an initialization command; and
      one or more of a power stage address and a group address to be assigned to the enabled power stage.

18. The system of claim 12, wherein each power stage is further configured to receive additional data packets associated with the task from the controller.

19. The system of claim 12, wherein the initialization data packet comprises:
   an initialization command; and
   at least one of a power stage address and a group address to be assigned to the power stage.

20. The system of claim 12, wherein the group address assigned to the power stage identifies one of:
   a subset of the plurality of power stages including the power stage; and
   the plurality of power stages.

* * * * *